United States Patent
Yamamoto et al.

(10) Patent No.: US 7,365,474 B2
(45) Date of Patent: Apr. 29, 2008

(54) DRIVING SYSTEM FOR VIBRATING TYPE ACTUATOR AND METHOD OF DRIVING VIBRATING TYPE ACTUATOR

(75) Inventors: Shinji Yamamoto, Yokohama (JP); Nobuyuki Kojima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 103 days.

(21) Appl. No.: 11/411,111

(22) Filed: Apr. 26, 2006

(65) Prior Publication Data

US 2006/0250047 A1    Nov. 9, 2006

(30) Foreign Application Priority Data

May 9, 2005    (JP)    ............... 2005-136371

(51) Int. Cl.
*H01L 41/08*    (2006.01)
(52) U.S. Cl. ............. 310/317; 310/316.02; 310/323.02
(58) Field of Classification Search ........... 310/316.02, 310/317, 323.02, 323.12
See application file for complete search history.

(56) References Cited

U.S. PATENT DOCUMENTS

| | | | | |
|---|---|---|---|---|
| 4,888,514 A | * | 12/1989 | Takahashi et al. ..... | 310/316.02 |
| 5,136,200 A | * | 8/1992 | Takizawa et al. ...... | 310/323.16 |
| 5,200,665 A | * | 4/1993 | Iijima .................... | 310/323.16 |
| 5,783,899 A | * | 7/1998 | Okazaki ................ | 310/317 |
| 5,859,490 A | * | 1/1999 | Saya ..................... | 310/316.02 |
| 5,932,952 A | * | 8/1999 | Takagi .................. | 310/323.02 |
| 6,104,122 A | * | 8/2000 | Ishimaru ............... | 310/323.02 |
| 6,144,140 A | * | 11/2000 | Iino et al. ............. | 310/316.02 |
| 6,806,620 B1 | * | 10/2004 | Wischnewskiy ....... | 310/323.02 |

FOREIGN PATENT DOCUMENTS

JP    2004-320846    11/2004

* cited by examiner

*Primary Examiner*—Mark Budd
(74) *Attorney, Agent, or Firm*—Fitzpatrick, Cella, Harper & Scinto

(57) ABSTRACT

Provided is a driving system for a vibrating type actuator capable of simplifying a driving circuit. A vibrating body of the vibrating type actuator can generate a first mode and a second mode which are different in a vibration form, in accordance with an alternate current signal to be supplied. An alternate current signal having a frequency close to a resonance frequency in the first mode or the second mode is applied either between an electrode Va and a common electrode Vc or between an electrode Vb and the common electrode Vc of the vibrating body of the vibrating type actuator. One of the electrodes to be supplied with the alternate current signal is selected by a switching element operated based on a signal from a driving direction switch.

12 Claims, 6 Drawing Sheets

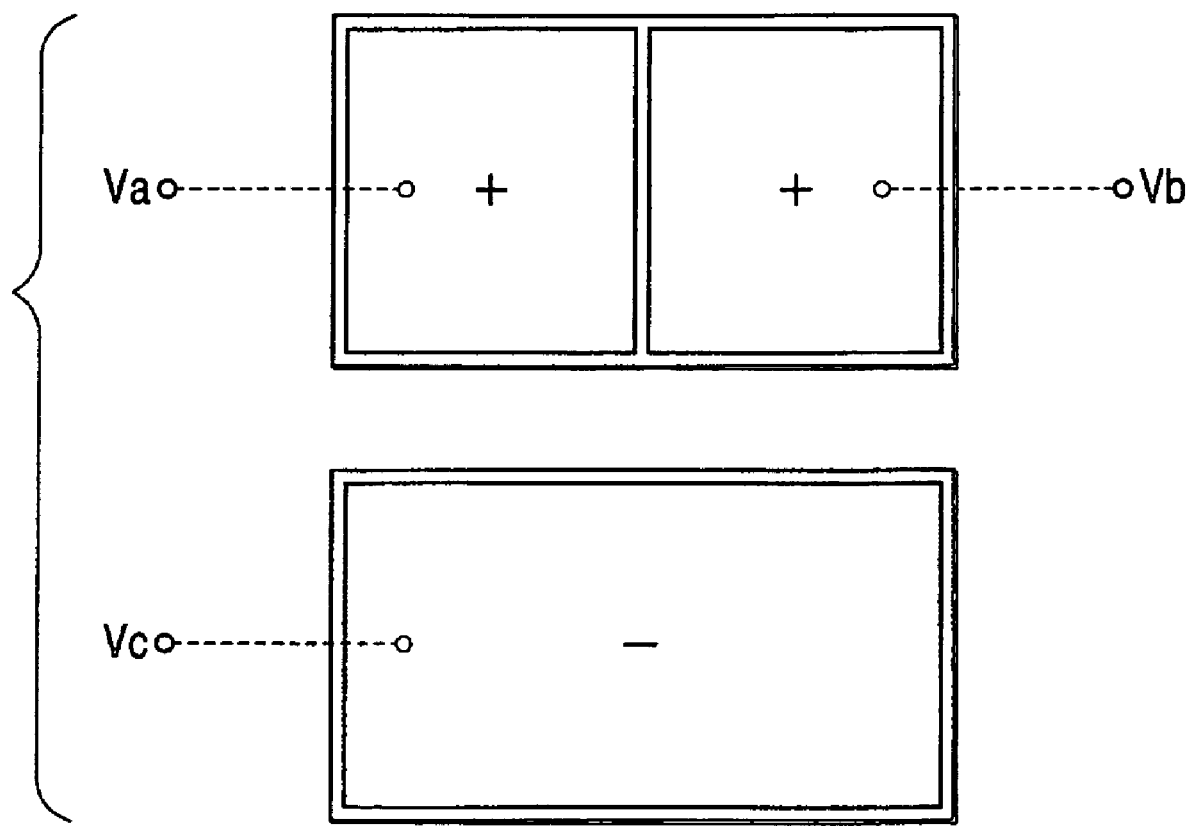

DRIVING SYSTEM FOR VIBRATING TYPE ACTUATOR AND METHOD OF DRIVING VIBRATING TYPE ACTUATOR

BACKGROUND OF THE INVENTION

1. Field of the Invention

The present invention relates to a driving system for a vibrating type actuator for driving a member to be driven by vibrating a vibrating body, and a method of driving the vibrating type actuator.

2. Related Background Art

As a vibrating type actuator for driving a member to be driven to move linearly, various actuators have been proposed. For example, Japanese Patent Application Laid-Open No. 2004-320846 discloses a linear ultrasonic actuator.

The above-mentioned linear ultrasonic actuator will be described with reference to FIGS. 6, 7, 8, 9 and 10. FIG. 6 is a perspective view schematically showing a configuration of a conventional linear ultrasonic actuator. FIG. 7 is a plan view showing a pattern of electrodes formed on a piezoelectric element shown in FIG. 6 as an electrical/mechanical energy transformation device. FIGS. 8A and 8B are perspective views schematically showing a first mode and a second mode, respectively, which are vibrating modes of a vibrating body shown in FIG. 6. FIG. 9 is a view schematically showing an oval motion occurring in projecting portions of the vibrating body shown in FIG. 6. FIG. 10 is a block diagram showing a driving circuit for driving the linear ultrasonic actuator shown in FIG. 6.

A linear ultrasonic actuator 17 includes a vibrating body 10 as shown in FIG. 6. The vibrating body 10 includes an elastic body 101 in a plate shape which is made of a metallic material, and a piezoelectric element 102 fixed to one surface of the elastic body 101. On the other surface of the elastic body 101, a pair of projecting portions 101a rising vertically are formed, and the respective projecting portions 101a are arranged in a longitudinal direction of the elastic body 101 at a predetermined interval therebetween. A moving body 12 made of a magnet is pressed by its magnetic force to be in contact with the respective projecting portions 101a. A method of pressing the respective projecting portions 101a and the moving body 12 is not limited to a method due to a magnetic force, and may be a method of pressing with an elastic member such as a spring.

On an exposed surface (surface opposed to the surface fixed to the elastic body 101) of the piezoelectric element 102, two electrodes Va and Vb arranged in the longitudinal direction are formed, as shown in FIG. 7. On the surface of the piezoelectric element 102 to which the elastic body 101 is fixed, a common electrode Vc is formed over an entire surface of the piezoelectric element 102, and the common electrode Vc is connected to a ground (common electric potential). The piezoelectric element 102 is previously polarized so that the polarities of a region overlapping the electrodes Va and Vb become the same in the thickness direction, or the polarities of the region overlapping the electrodes Va and Vb become opposite in the thickness direction. Herein, an example will be described in which the polarities of the region overlapping the electrodes Va and Vb are the same in the thickness direction.

When alternate current signals in phase with the same frequency are applied respectively between the electrode Va and the common electrode Vc and between the electrode Vb and the common electrode Vc, of the piezoelectric element 102, a vibration in the second mode as shown in FIG. 8B occurs in the vibrating body 10. The vibration in the second mode is a primary bending vibration (flexural vibration) in a short-side direction of the vibrating body 10. Furthermore, when alternate current signals in a reversed phase are applied respectively between the electrode Va and the common electrode Vc and between the electrode Vb and the common electrode Vc, a vibration in the first mode as show in FIG. 8A occurs in the vibrating body 10. The vibration in the first mode is a secondary bending vibration (flexural vibration) in a long-side direction of the vibrating body 10. The vibration occurring in the first mode is different from the vibration occurring in the second mode not only in the direction in which an antinode and a node are arranged, but also in the position of a node. To be specific, the direction in which an antinode and a node are arranged in the first vibration mode is orthogonal to that in the second vibration mode.

Herein, the vibrating body 10 is configured so that resonance frequencies at a time of the vibration in the first mode and the vibration in the second mode are substantially matched with each other. When alternate current signals, which have frequencies close to the above-mentioned resonance frequency, and whose phases are neither in phase and nor reversed phase, are applied to the respective electrodes Va and Vb, the vibrations in the first mode and the second mode, each of which has a phase difference of $\pi/2$(rad) or $-\pi/2$(rad), occur in the vibrating body 10. At this time, each projecting portion 101a of the vibrating body 10 is formed at a position where the node portion of the vibration in the first mode is matched with the antinode portion of the vibration in the second mode, so that an oval motion as shown in FIG. 9 occurs on each projecting portion 101a of the vibrating body 10. Owing to the oval motion, the moving body 12 moves linearly in its longitudinal direction.

The driving circuit for driving the linear ultrasonic actuator 17 includes an alternate current signal generator 13, a phase shifter 14, and two step-up circuits 15 and 16, as shown in FIG. 10. The alternate current signal generator 13 generates two alternate current signals in phase with the same frequency. The phase shifter 14 outputs one alternate current signal (alternate current signal corresponding to the second mode) output from the alternate current signal generator 13 while shifting the alternate current signal by a predetermined phase amount. Herein, a shift amount $\phi$ of a phase is in a range satisfying a relationship of $0<\phi<\pi$. The step-up circuit 16 steps up the voltage of the alternate current signal output from the phase shifter 14 to a voltage at which the linear ultrasonic actuator 17 is operable. The step-up circuit 15 steps up the voltage of the other alternate current signal (alternate current signal corresponding to the first mode) output from the alternate current signal generator 13 to a voltage at which the linear ultrasonic actuator 17 is operable. The alternate current signal with the voltage stepped up by the step-up circuit 15 is applied to the electrode Va of the piezoelectric element 102, and the alternate current signal with the voltage stepped up by the step-up circuit 16 is applied to the electrode Vb of the piezoelectric element 102. Furthermore, the above-mentioned driving circuit is connected to a ground in the same way as in the common electrode Vc of the piezoelectric element 102.

In the driving circuit thus configured, the shift amount of a phase in the phase shifter 14 is adjusted, thereby making it possible to change an amplitude ratio of two vibration modes of the vibrating body 10, i.e., an oval ratio of the oval motion shown in FIG. 9. As a result, the drive speed and the drive direction of the linear ultrasonic actuator 17 with respect to the moving body 12 can be controlled.

However, in order to drive the above-mentioned conventional linear ultrasonic actuator, the above-mentioned circuit for generating alternate current signals in two phases and circuits for stepping up the voltages of the respective alternate current signals are required. This enlarges the circuit scale of the driving circuit, making it difficult to configure the driving circuit at a low cost.

SUMMARY OF THE INVENTION

The present invention has been made in consideration of the above situation, and has as its object to provide a driving system for a vibrating type actuator capable of simplifying a driving circuit and a method of driving the vibrating type actuator.

According to the present invention, the foregoing object is attained by providing a driving system for a vibrating type actuator including a driving circuit of the vibrating type actuator for driving a member to be driven by vibrating a vibrating body, which includes:

a vibrating body including an electrical/mechanical energy transformation device having at least two electrodes and an elastic body to which the electrical/mechanical energy transformation device is fixed, the vibrating body being vibrated in a first vibration mode when alternate current signals with an identical frequency in phase are applied to the two electrodes and being vibrated in a second vibration mode when alternate current signals with an identical frequency in reversed phase are applied to the two electrodes;

an alternate current signal generating circuit for generating an alternate current signal as a drive signal to be applied to one of the two electrodes; and an electrode selecting circuit for selecting one of the two electrodes as an electrode to be supplied with the alternate current signal generated by the alternate signal generator.

According to the present invention, the foregoing object is attained by providing a vibrating type actuator driving a member to be driven by vibrating a vibrating body and a driving system for a vibrating type actuator having a driving circuit of the vibrating type actuator, which includes:

a vibrating body including an electrical/mechanical energy transformation device having at least two electrodes and an elastic body to which the electrical/mechanical energy transformation device is fixed, the vibrating body being vibrated in a first vibration mode when alternate current signals with an identical frequency in phase are applied to the two electrodes and being vibrated in a second vibration mode when alternate current signals with an identical frequency in reversed phase are applied to the two electrodes;

an alternate current signal generating circuit for generating an alternate current signal as a drive signal to be applied to the two electrodes; and a control circuit for controlling an amount of a current flowing through one of the two electrodes and an amount of a current flowing through the other electrode when the alternate current signal generated by the alternate current signal generating circuit is applied to the two electrodes.

According to the present invention, the foregoing object is attained by providing a method of driving a vibrating type actuator for driving a vibrating body and a member to be driven due to a vibration occurring in the vibrating body, the vibrating body including an electrical/mechanical energy transformation element having at least two electrodes and an elastic body to which the electrical/mechanical energy transformation element is fixed, being vibrated in a first vibration mode when alternate current signals with an identical frequency in phase are applied to the two electrodes, and being vibrated in a second vibration mode when alternate current signals with an identical frequency in reversed phase are applied to the two electrodes, the method including the steps of:

generating an alternate current signal as a drive signal to be applied to one of the two electrodes; and selecting one of the two electrodes as an electrode to be supplied with the alternate current signal.

According to the present invention, the foregoing object is attained by providing a method of driving a vibrating type actuator for driving a vibrating body and a member to be driven due to a vibration occurring in the vibrating body, the vibrating body including an electrical/mechanical energy transformation element having at least two electrodes and an elastic body to which the electrical/mechanical energy transformation element is fixed, being vibrated in a first vibration mode when alternate current signals with an identical frequency in phase are applied to the two electrodes, and being vibrated in a second vibration mode when alternate current signals with an identical frequency in reversed phase are applied to the two electrodes, the method including the steps of:

generating an alternate current signal as a drive signal to be applied to the two electrodes; and controlling an amount of a current flowing through one of the two electrodes and an amount of a current flowing through the other electrode when the alternate current signal is applied to the two electrodes.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a plan view showing a pattern of electrodes formed on a piezoelectric element shown in FIG. 6;

DESCRIPTION OF THE PREFERRED EMBODIMENTS

Preferred embodiments of the present invention will be described in detail in accordance with the accompanying drawings.

First Embodiment

Figure 1:
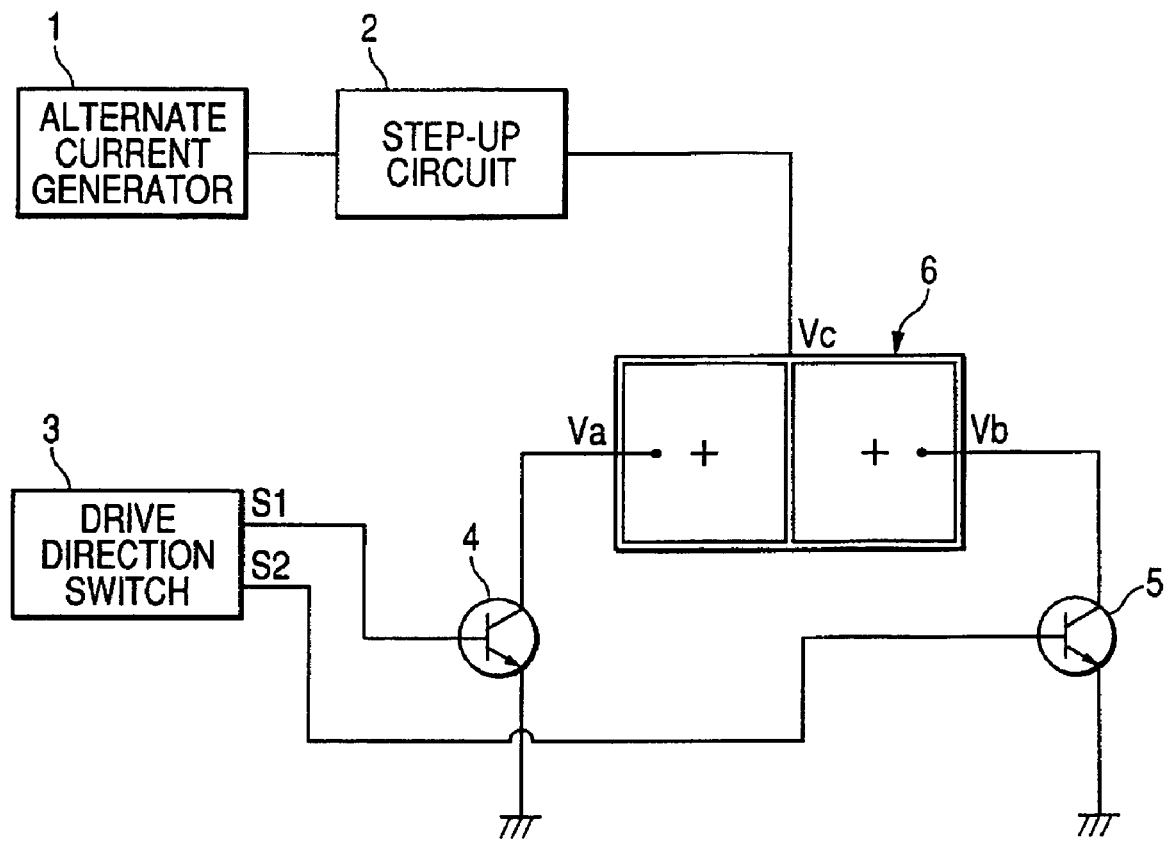
FIG. 1 is a block diagram showing a configuration of a driving system for a vibrating type actuator according to a first embodiment of the present invention.
Figure 2:
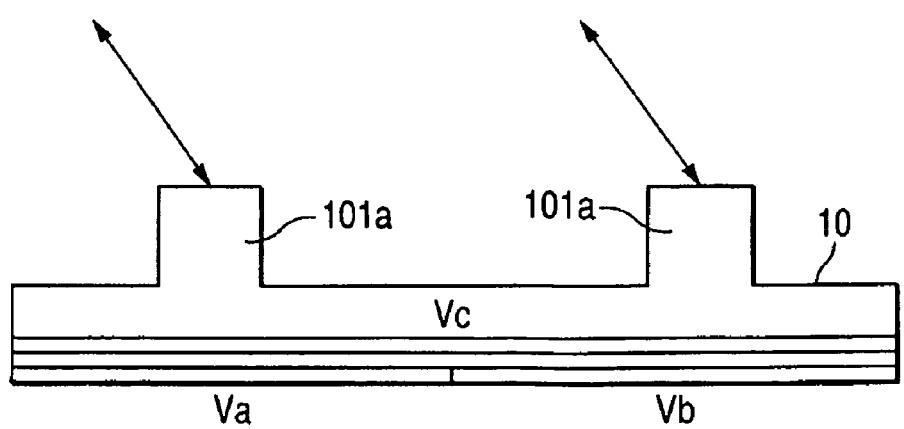
FIG. 2 is a view schematically showing a vibration direction of each projecting portion of a vibrating body in a case where an alternate current signal is applied only between an electrode Va and a common electrode Vc of the vibrating type actuator shown in FIG. 1.
Figure 3:
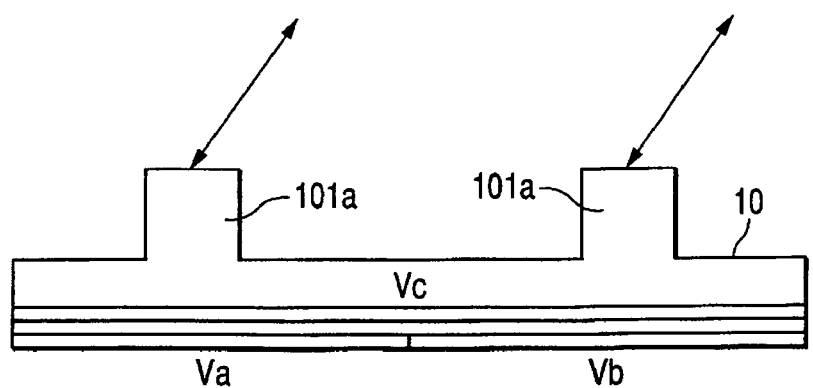
FIG. 3 is a view schematically showing a vibration direction of each projecting portion of a vibrating body in a case where an alternate current signal is applied only between an electrode Vb and the common electrode Vc of the vibrating type actuator shown in FIG. 1.

FIG. 1 is a block diagram showing a configuration of a driving system for a vibrating type actuator according to a first embodiment of the present invention. FIG. 2 is a view schematically showing a vibration direction of each projecting portion of a vibrating body in a case where an alternate current signal is applied only between an electrode Va and a common electrode Vc of the vibrating type actuator shown in FIG. 1. FIG. 3 is a view schematically showing a motion direction (vibration direction) of each projecting portion of a vibrating body in a case where an alternate current signal is applied only between an electrode Vb and the common electrode Vc of the vibrating type actuator shown in FIG. 1.

Figure 6:
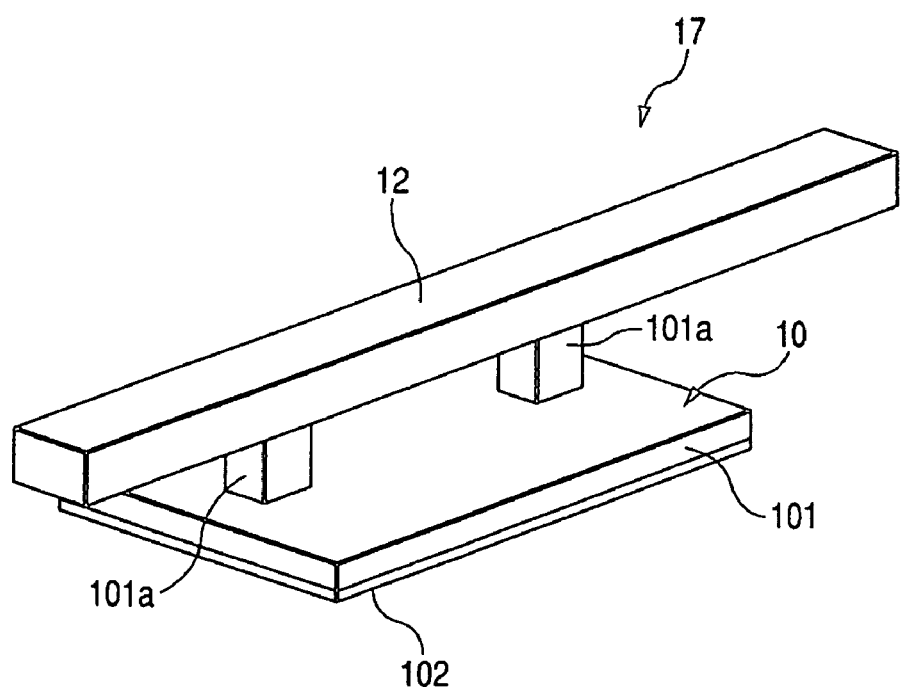
FIG. 6 is a perspective view showing a configuration of a conventional linear ultrasonic actuator.

The driving system for the vibrating type actuator of this embodiment includes a linear ultrasonic actuator 6 that is a vibrating type actuator, and a driving circuit for driving the same, as shown in FIG. 1. Herein, the linear ultrasonic actuator 6 has the same configuration as that of the linear ultrasonic actuator 17 shown in FIG. 6. Furthermore, on a piezoelectric element 10 of the linear ultrasonic actuator 6 in this embodiment, electrodes Va and Vb, and a common electrode Vc having the same pattern as that shown in FIG. 7 are provided. Thus, herein, the description of the configuration of the linear ultrasonic actuator 6 is omitted, and the driving circuit for driving the linear ultrasonic actuator 6 will be described. Members (not shown) constituting the linear ultrasonic actuator 6 will be described with the same members as those of the linear ultrasonic actuator 17 shown in FIG. 6 being denoted with the same reference symbols as those therein.

Figure 8A:
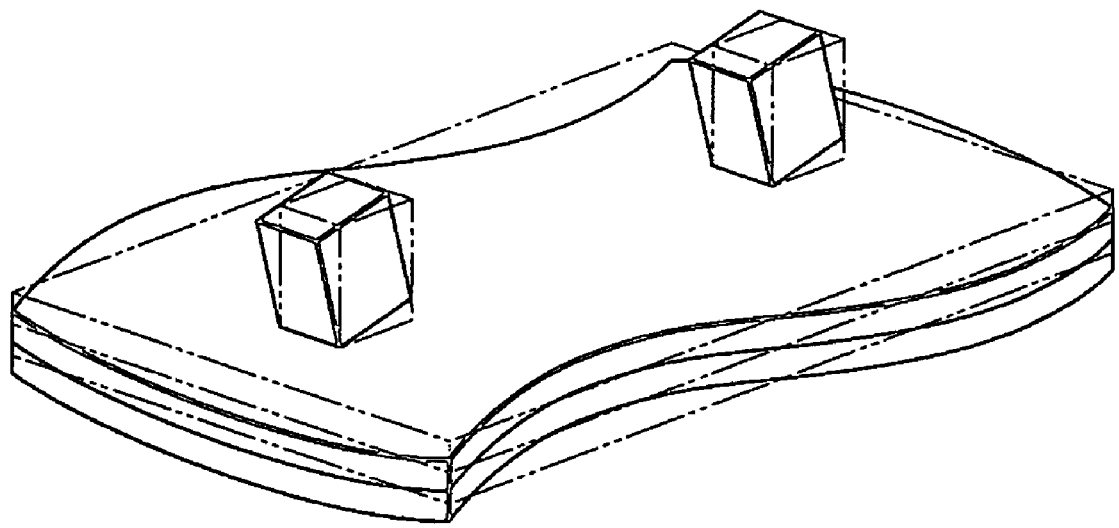
FIGS. 8A and 8B are perspective views schematically showing a first mode and a second mode that are vibration modes of a vibrating body shown in FIG. 6.
Figure 8B:
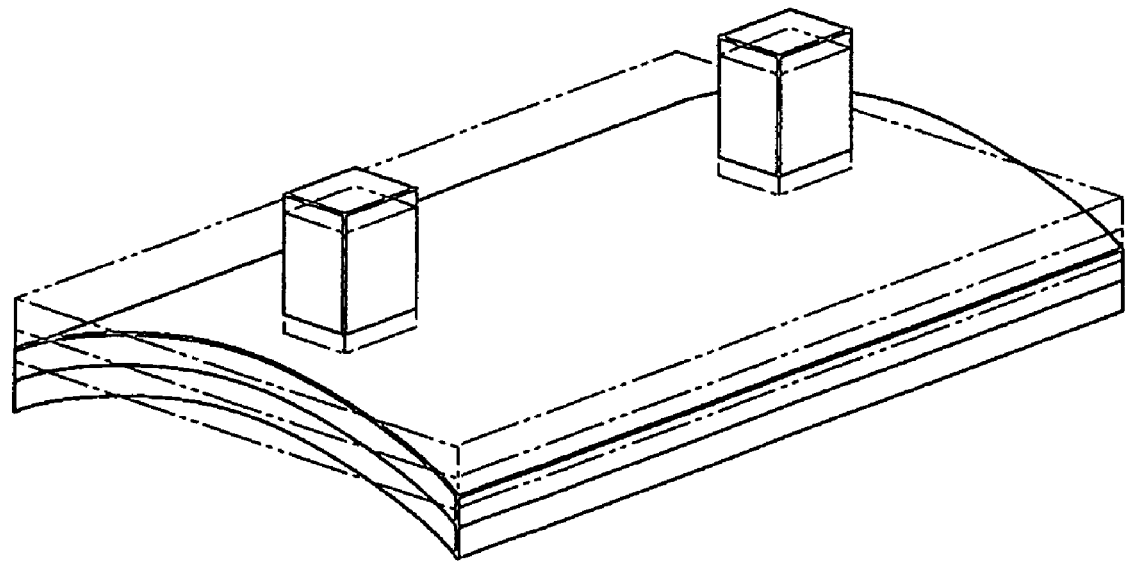
Figure 9:
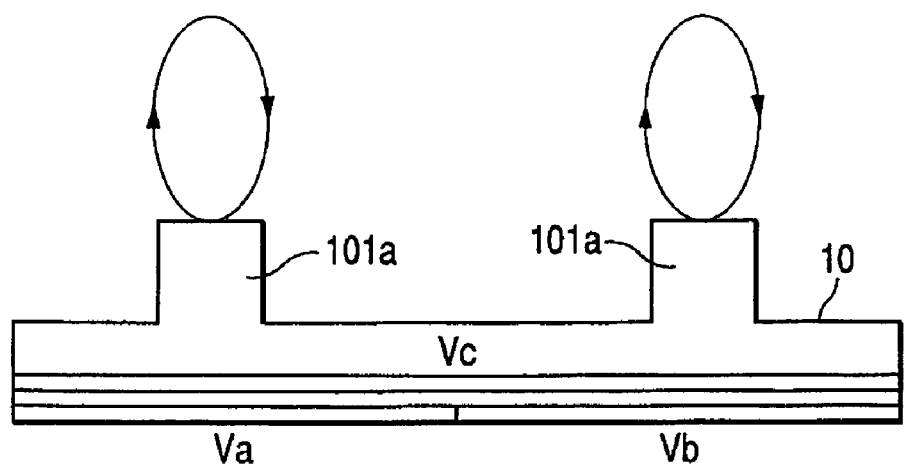
FIG. 9 is a view schematically showing an oval motion occurring on a projecting portion of the vibrating body.
Figure 10:
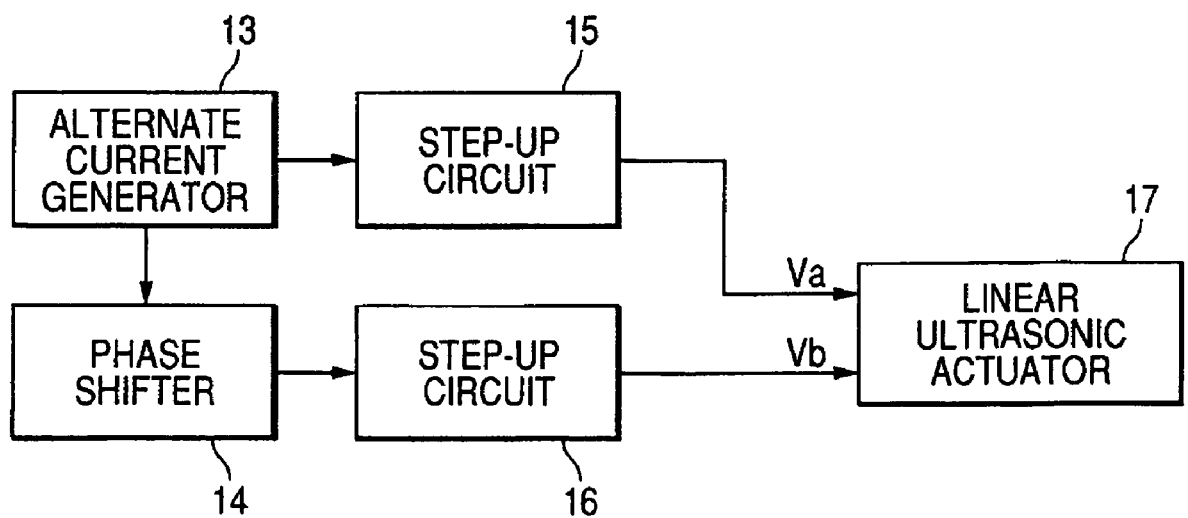
FIG. 10 is a block diagram showing a driving circuit for driving the linear ultrasonic actuator shown in FIG. 6.

In this embodiment, by applying an alternate current signal (third alternate current signal) either between the electrode Va and the common electrode Vc, or between the electrode Vb and the common electrode Vc, the vibrating body 10 can be vibrated concurrently in the respective vibration modes, a first mode shown in FIG. 8A and a second mode shown in FIG. 8B. Herein, the above-mentioned alternate current signal has a frequency close to a resonance frequency in the first mode and the second mode of the linear ultrasonic actuator 6.

In the case of applying the above-mentioned alternate current signal only between the electrode Va and the common electrode Vc, a moment at which the vibration amplitude becomes maximum on the projecting portion 101a side opposed to the electrode Va in the first mode shown in FIG. 8A coincides with a moment at which the vibration amplitude becomes maximum on the projecting portion 101a side in the second mode shown in FIG. 8B. The operation in this case is as follows. As shown in FIG. 2, when each projecting portion 101a of the vibrating body 10 is tilted in the left direction in the drawing due to the first mode, each entire projecting portion 101a is lifted upward due to the second mode. As a result, the vibrating body 10 generates a vibration so as to move in a direction represented by the arrow shown in FIG. 2, i.e., a direction tiled diagonally leftward. Under a state where such the vibration occurs, the moving body 12 (shown in FIG. 6) that is pressed to be in contact with the respective projecting portions 101a is driven in the left direction.

On the other hand, in the case of applying the above-mentioned alternate current signal only between the electrode Vb and the common electrode Vc, a moment at which the vibration amplitude becomes maximum on the projecting portion 101a side opposed to the electrode Vb in the first mode shown in FIG. 8A coincides with a moment at which the vibration amplitude of the projecting portion 101a becomes maximum in the second mode shown in FIG. 8B. As a result, as shown in FIG. 3, the vibrating body 10 generates a vibration so as to move in a direction represented by the arrow shown in FIG. 3, i.e., a direction tiled diagonally rightward. Under a state where such the vibration occurs, the moving body 12 (shown in FIG. 6) that is pressed to be in contact with the respective projecting portions 101a is driven in the right direction.

Thus, by applying the above-mentioned alternate current signal only either between the electrode Va and the common electrode Vc on the piezoelectric element 102 or between the electrode Vb and the common electrode Vc on the piezoelectric element 102, the moving body 12 can be driven. Furthermore, the drive direction of the moving body 12 can be switched by selecting the application of an alternate current signal between the electrode Va and the common electrode Vc or between the electrode Vb and the common electrode Vc.

Next, the driving circuit for realizing the above-mentioned driving method will be described.

As shown in FIG. 1, the driving circuit for driving the ultrasonic actuator 6 includes an alternate current signal generator 1, a step-up circuit 2, a drive direction switch 3, and two switching elements 4 and 5. The alternate current signal generator 1 generates and outputs an alternate current signal in a single phase which is applied to the linear ultrasonic actuator 6. This alternate current signal has a frequency close to a resonance frequency in the first or second mode of the linear ultrasonic actuator 6. The step-up circuit 2 steps up the voltage of the alternate current signal output from the alternate current signal generator 1 to a voltage at which the linear ultrasonic actuator 6 is operable. As the step-up circuit 2, known circuits that use a transformer or step up a voltage with a resonance circuit using a coil and a capacitor, for example, can be used.

The alternate current signal with the voltage stepped up by the step-up circuit 2 is applied to the common electrode Vc of the piezoelectric element 102 of the linear ultrasonic actuator 6. In contrast, the respective electrodes Va and Vb of the piezoelectric element 102 are connected to a ground via the corresponding switching elements 4 and 5, respectively.

The operation of the respective switching elements 4 and 5 is controlled with signals S1 and S2 output from the drive direction switch 3. To be specific, the drive direction switch 3 causes the voltage of either one of the signals S1 and S2 to be high level exclusively in accordance with the drive direction of the linear ultrasonic actuator 6 designated from outside. For example, in a case of applying an alternate current signal only between the electrode Va and the common electrode Vc, the signal S1 is caused to be a high level. Because of this, the switching element 4 is turned on (short-circuited), and the alternate current signal is applied only between the electrode Va and the common electrode Vc. In this case, as described above, the drive direction of the linear ultrasonic actuator 6 (moving body 12) becomes the left direction (see FIG. 2). On the contrary, in the case of applying an alternate current signal only between the electrode Vb and the common electrode Vc, the signal S2 is caused to be a high level. Because of this, the switching element 5 is turned on (short-circuited), and an alternate current signal is applied only between the electrode Vb and the common electrode Vc. In this case, as descried above, the drive direction of the linear ultrasonic actuator 6 (moving body 12) becomes the right direction (see FIG. 3).

Thus, by controlling the operation of the switching elements 4 and 5 with the drive direction switch 3, an alternate current signal can be applied only either between the electrode Va and the common electrode Vc, or between the electrode Vb and the common electrode Vc. As a result, the drive direction of the linear ultrasonic actuator 6 can be controlled only with an alternate current signal in one phase.

As described above, according to this embodiment, a linear ultrasonic actuator of the type which conventionally requires an alternate current signal in two phases as a drive signal can be driven only with an alternate current signal in one phase, which can simplify the circuit configuration of the driving circuit.

Furthermore, in this embodiment, the case where the linear ultrasonic actuator using a combination of two bending modes is driven has been described. However, the present invention is not limited to such the linear ultrasonic actuator, and the principle of the present invention can also be applied to the case where a linear ultrasonic actuator using an expansion/contraction mode, a twisting mode, etc. is driven.

Furthermore, the principle of the present invention can be applied to an ultrasonic actuator of a rotation type, instead of being limited to a linear type, as long as the relationship between the electrodes and the vibration mode is identical with that of this embodiment.

Second Embodiment

Figure 4:
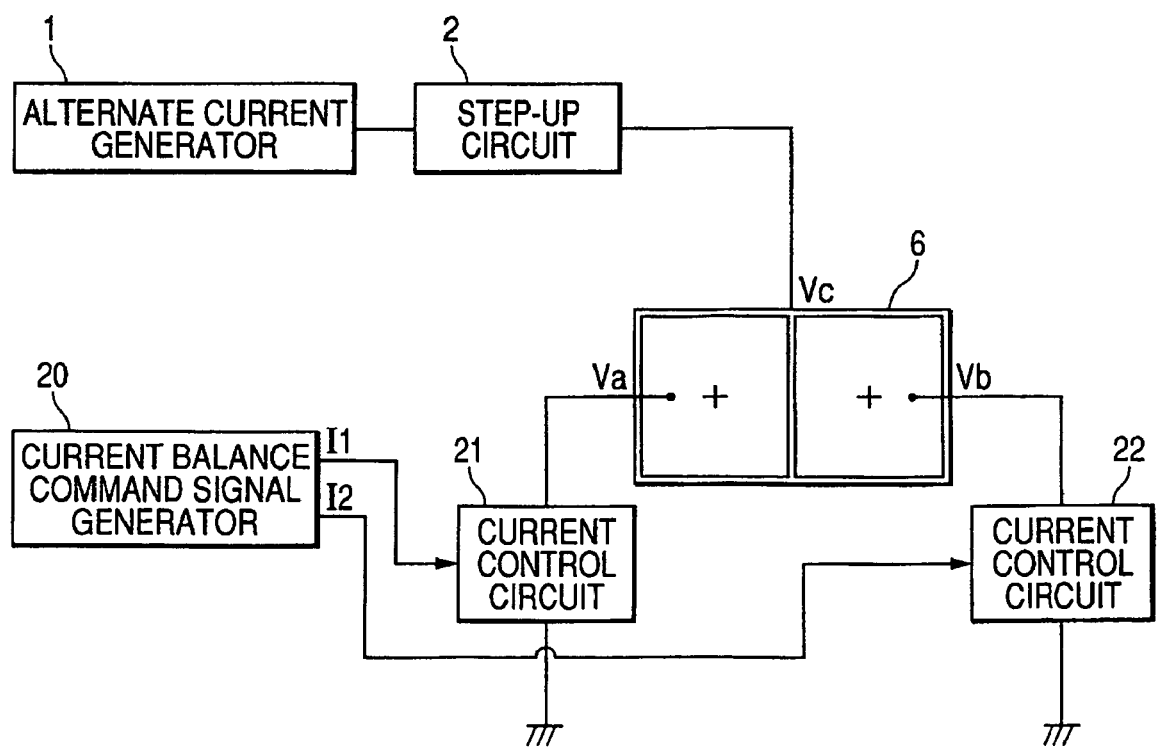
FIG. 4 is a block diagram showing a configuration of a driving system for a vibrating type actuator according to a second embodiment of the present invention.
Figure 5:
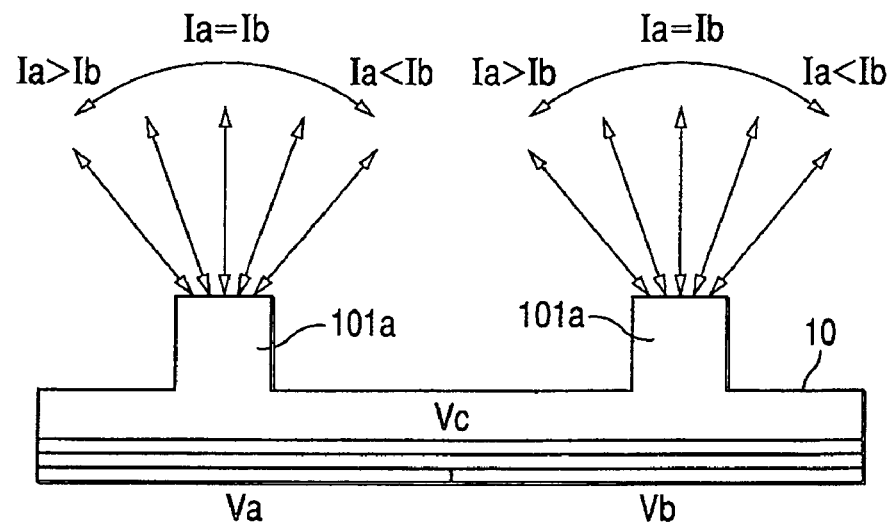
FIG. 5 is a view schematically showing a change state of a motion direction (vibration direction) of each projecting portion of the vibrating type actuator shown in FIG. 4.

Next, a second embodiment of the present invention will be described with reference to FIGS. 4 and 5. FIG. 4 is a block diagram showing a configuration of a driving circuit of a vibrating type actuator according to the second embodiment of the present invention. FIG. 5 is a view schematically showing a change state of a motion direction (vibration direction) of each projecting portion of the vibrating type actuator shown in FIG. 4.

In the first embodiment mentioned above, in order to control the drive direction of the linear ultrasonic actuator, an alternate current signal is applied selectively either between the electrode Va and the common electrode Vc, or between the electrode Vb and the common electrode Vc on the piezoelectric element 102. However, in the case of the configuration of the first embodiment, there is a limit to the realization of minute driving and low-speed driving. To be specific, in each of the state where an alternate current signal is applied between the electrode Va and the common electrode Vc, and the state where an alternate current signal is applied between the electrode Vb and the common electrode Vc, a relatively strong drive force acts on either direction with respect to a moving body 12. Therefore, it is difficult to drive the moving body 12 at a low speed, for example, immediately before the moving body 12 stops.

This embodiment is configured in such a manner that, in order to allow the moving body 12 to be driven at a low speed, for example, immediately before the moving body 12 stops, an alternate current signal in one phase is applied to the common electrode Vc to control the amount of a current flowing from the electrodes Va and Vb to the ground (common electric potential).

In this embodiment, a case where the ultrasonic actuator 6 having the same configuration as that of the first embodiment mentioned above is driven will be descried. Herein, the description of the configuration of the linear ultrasonic actuator 6 is omitted, and the driving circuit for driving the linear ultrasonic actuator 6 will be described.

As shown in FIG. 4, the driving circuit for driving the linear ultrasonic actuator 6 includes an alternate current signal generator 1, a step-up circuit 2, an electric current balance signal generator 20, and two current control circuits 21 and 22. The alternate current signal generator 1 generates an alternate current signal having a frequency close to a resonance frequency in the first or second mode of the linear ultrasonic actuator 6. The step-up circuit 2 steps up the voltage of the alternate current signal output from the alternate current signal generator 1 to a voltage at which the linear ultrasonic actuator 6 is operable.

The alternate current signal with the voltage stepped up by the step-up circuit 2 is applied to the common electrode Vc of the piezoelectric element 102 of the linear ultrasonic actuator 6. In contrast, the respective electrodes Va and Vb of the piezoelectric element 102 are connected to a ground via the corresponding current control circuits 21 and 22, respectively. The magnitude of a current Ia flowing from the electrode Va to a ground, and the magnitude of the current Ib flowing from the electrode Vb to a ground are controlled with the current control circuits 21 and 22. The current control circuits 21 and 22 regulate the respective magnitudes of the current Ia flowing from the electrode Va to the ground, and the current Ib flowing from the electrode Vb to the ground, based on the electric current balance signals I1 and I2 from the electric current balance signal generator 20. Herein, the electric current balance signals I1 and I2 output from the electric current balance signal generator 20 control the relationship in magnitude between the current Ia flowing from the electrode Va to the ground and the current Ib flowing from the current Vb to the ground, in accordance with the drive direction and the drive speed of the ultrasonic actuator 6 designated from outside. Because of this, the relationship in magnitude between the currents Ia and Ib flowing from the electrodes Va and Vb to the ground is controlled.

As described in the first embodiment, in the case where the above-mentioned alternate current signal is applied only between the electrode Va and the common electrode Vc, each projecting portion 101a of the vibrating body 10 moves in a direction tiled diagonally leftward as shown in FIG. 2. Furthermore, in the case where an alternate current signal is applied only between the electrode Vb and the common electrode Vc, the projecting portion 101a of the vibrating body 10 moves in a direction tilted diagonally rightward as shown in FIG. 3.

When alternate current signals with the same frequency in phase are applied to the common electrode Vc while the relationship in magnitude between the currents Ia and Ib flowing from the electrodes Va and Vb to the ground is being controlled, the vibrating body 10 can be vibrated so that each projecting portion 101a moves in a direction between the direction shown in FIG. 2 and the direction shown in FIG. 3. To be specific, when the relationship in magnitude between the current Ia flowing from the electrode Va to the ground and the current Ib flowing from the electrode Vb to the ground is changed, the projecting portion 101a of the vibrating body 10 can be moved along a track as shown in FIG. 5. For example, when the relationship in magnitude between the currents Ia and Ib is controlled so that the current Ia increases gradually with respect to the current Ib, the motion direction of each projecting portion 101a is tilted gradually toward the left side. In contrast, when the relationship in magnitude between the currents Ia and Ib is controlled so that the current Ia decreases gradually with respect to the current Ib, the motion direction of each projecting portion 101a is tilted gradually toward the right side. Furthermore, when the magnitude of the current Ia is set to be equal to that of the current Ib, the motion direction of each projecting portion 101a becomes vertical to the vibrating body 10. In this case, the moving body 12 that is pressed to be in contact with each projecting portion 101a is substantially stopped.

As described above, according to this embodiment, an alternate current signal in one phase is applied to the common electrode Vc, and the relationship in magnitude between the currents Ia and Ib flowing from the electrodes Va and Vb to the ground is controlled, with the result that the motion direction of each projecting portion 101a of the vibrating body 10 is varied. As a result, the moving body 12 can be driven so as to shift from a suspension state to a low-speed drive state or vice versa, and furthermore, to shift smoothly and continuously from a low-speed drive state to a high-speed drive state or vice versa. Furthermore, by setting one of the currents Ia and Ib flowing from the electrodes Va and Vb to the ground to be zero, the control similar to that of the first embodiment can also be conducted.

This application claims priority from Japanese Patent Application No. 2005-136371 filed on May 9, 2005, which is hereby incorporated by reference herein.

What is claimed is:

1. A driving system for a vibrating type actuator comprising a driving circuit of the vibrating type actuator for driving a member to be driven by vibrating a vibrating body, comprising:
    a vibrating body comprising an electrical/mechanical energy transformation element having at least two electrodes and an elastic body to which the electrical/mechanical energy transformation element is fixed, the vibrating body being vibrated in a first vibration mode when alternate current signals with an identical frequency in phase are applied to the two electrodes and being vibrated in a second vibration mode when alternate current signals with an identical frequency in reversed phase are applied to the two electrodes;
    an alternate current signal generating circuit for generating an alternate current signal as a drive signal to be applied to one of the two electrodes; and
    an electrode selecting circuit for selecting one of the two electrodes as an electrode to be supplied with the alternate current signal generated by the alternate signal generator.

2. A driving system for a vibrating type actuator according to claim 1, wherein the electrode selecting circuit selects one of the two electrodes as an electrode to be supplied with the alternate current signal in accordance with an intended drive direction of the member to be driven.

3. A driving system for a vibrating type actuator according to claim 1, wherein:
    the electrical/mechanical energy transformation element has a pair of surfaces opposed to each other, and the two electrodes are formed on one surface of the electrical/mechanical energy transformation element and a common electrode is formed on the other surface thereof; and
    the alternate current signal generated by the alternate current signal generating circuit is applied to the common electrode, and the electrode selecting circuit selects one of the two electrodes as an electrode to be supplied with the alternate current signal in accordance with an intended drive direction of the member to be driven and connects the selected electrode to a common electric potential.

4. A driving system for a vibrating type actuator according to claim 1, wherein the vibrating body is formed in a rectangular plate shape, the two electrodes of the electrical/mechanical energy transformation element are arranged in a long-side direction of the vibrating body, the first vibration mode is a short-side direction primary bending mode of the vibrating body, and the second vibration mode is a long-side direction secondary bending mode of the vibrating body.

5. A driving system for a vibrating type actuator comprising a driving circuit of the vibrating type actuator for driving a member to be driven by vibrating a vibrating body, comprising:
    a vibrating body comprising an electrical/mechanical energy transformation element having at least two electrodes and an elastic body to which the electrical/mechanical energy transformation element is fixed, the vibrating body being vibrated in a first vibration mode when alternate current signals with an identical frequency in phase are applied to the two electrodes and being vibrated in a second vibration mode when alternate current signals with an identical frequency in reversed phase are applied to the two electrodes;
    an alternate current signal generating circuit for generating an alternate current signal as a drive signal to be applied to the two electrodes; and
    a control circuit for controlling an amount of a current flowing through one of the two electrodes and an amount of a current flowing through the other electrode when the alternate current signal generated by the alternate current signal generating circuit is applied to the two electrodes.

6. A driving system for a vibrating type actuator according to claim 5, wherein the control circuit controls the amount of the current flowing through the one of the two electrodes and the amount of the current flowing through the other electrode, respectively, in accordance with an intended drive direction and an intended drive speed of the member to be driven.

7. A driving system for a vibrating type actuator according to claim 5, wherein:
    the electrical/mechanical energy transformation element has a pair of surfaces opposed to each other, and the two electrodes are formed on one surface of the electrical/mechanical energy transformation element and a common electrode is formed on the other surface thereof; and
    the alternate current signal generated by the alternate current signal generating circuit is applied to the common electrode, and the control circuit controls an amount of a current between the one of the two electrodes and the common electrode and an amount of a current between the other electrode and the common electrode in accordance with the intended drive direction and the intended drive speed of the member to be driven.

8. A driving system for a vibrating type actuator according to claim 5, wherein the vibrating body is formed in a rectangular plate shape, the two electrodes of the electrical/mechanical energy transformation element are arranged in a long-side direction of the vibrating body, the first vibration mode is a short-side direction primary bending mode of the vibrating body, and the second vibration mode is a long-side direction secondary bending mode of the vibrating body.

9. A method of driving a vibrating type actuator for driving a vibrating body and a member to be driven due to a vibration occurring in the vibrating body, the vibrating body comprising an electrical/mechanical energy transformation element having at least two electrodes and an elastic body to which the electrical/mechanical energy transformation element is fixed, being vibrated in a first vibration mode when alternate current signals with an identical frequency in phase are applied to the two electrodes, and being vibrated in a second vibration mode when alternate current signals with an identical frequency in reversed phase are applied to the two electrodes, the method comprising the steps of:

generating an alternate current signal as a drive signal to be applied to one of the two electrodes; and selecting one of the two electrodes as an electrode to be supplied with the alternate current signal.

10. A method of driving a vibrating type actuator according to claim 9, wherein the electrode selecting step includes selecting one of the two electrodes as an electrode to be supplied with the alternate current signal in accordance with an intended drive direction of the member to be driven.

11. A method of driving a vibrating type actuator for driving a vibrating body and a member to be driven due to a vibration occurring in the vibrating body, the vibrating body comprising an electrical/mechanical energy transformation element having at least two electrodes and an elastic body to which the electrical/mechanical energy transformation element is fixed, being vibrated in a first vibration mode when alternate current signals with an identical frequency in phase are applied to the two electrodes, and being vibrated in a second vibration mode when alternate current signals with an identical frequency in reversed phase are applied to the two electrodes, the method comprising the steps of:

generating an alternate current signal as a drive signal to be applied to the two electrodes; and controlling an amount of a current flowing through one of the two electrodes and an amount of a current flowing through the other electrode when the alternate current signal is applied to the two electrodes.

12. A method of driving a vibrating type actuator according to claim 11, wherein the controlling step includes controlling the amount of the current flowing through the one of the two electrodes and the amount of the current flowing through the other electrode, respectively, in accordance with an intended drive direction and an intended drive speed of the member to be driven.

* * * * *

UNITED STATES PATENT AND TRADEMARK OFFICE
CERTIFICATE OF CORRECTION

PATENT NO. : 7,365,474 B2  Page 1 of 1
APPLICATION NO. : 11/411111
DATED : April 29, 2008
INVENTOR(S) : Yamamoto et al.

It is certified that error appears in the above-identified patent and that said Letters Patent is hereby corrected as shown below:

COLUMN 1:
Line 54, "is" should read --was--.

COLUMN 2:
Line 6, "show" should read --shown--.
Line 22, "and" (second occurrence) should be deleted.
Line 23, "reversed" should read --in reversed--.

COLUMN 6:
Line 4, "tiled" should read --tilted--.
Line 19, "tiled" should read --tilted--.

COLUMN 8:
Line 10, "descried." should read --described.--.
Line 54, "tiled" should read --tilted--.

Signed and Sealed this

Third Day of March, 2009

JOHN DOLL
*Acting Director of the United States Patent and Trademark Office*